April 18, 1967     R. J. FERNEKES     3,315,226

ELECTRIC SOUNDER DEVICE

Filed Nov. 12, 1964

INVENTOR
ROLAND J. FERNEKES

BY    Robert D. Sommer

AGENT though the case 45 has been shown as fully enclosing the bimetal switch and the electromagnet, it will be understood that it need not be fully closed but is merely required to have a portion suitably located to be struck by the striker arm 44.

United States Patent Office
3,315,226
Patented Apr. 18, 1967

3,315,226
ELECTRIC SOUNDER DEVICE
Roland J. Fernekes, Grosse Point, Mich., assignor to Essex Wire Corporation, Fort Wayne, Ind., a corporation of Michigan
Filed Nov. 12, 1964, Ser. No. 410,815
3 Claims. (Cl. 340—75)

This invention relates to electric sounder devices useful in vehicle turn signal systems.

The usual vehicle turn signal system employs turn signal switches with mechanical means by which a turn signal is set manually by the operator of the vehicle before making the turn and by which the signal is automatically cancelled after the vehicle has completed its turn. These mechanical means include reset members operated by the steering mechanism of the vehicle to cancel an indicated turn signal when the wheels of the vehicle are returned to a straight ahead position after completion of the indicated turn. Because of mechanical considerations and to prevent premature cancelling of the indicated turn signal resulting from a slight reversal of the steering mechanism during turning movement of the vehicle, the turn signal mechanical means are usually constructed to require a substantial degree of movement of the steering mechanism away from its straight ahead position before its return movement is effective to cancel the indicated turn signal. Consequently a turn signal is often indicated after a completed turn. This condition is apt to occur on multi-lane roads where it is customary to use the turn signal when changing from one lane to another while passing another vehicle. The same condition may result from other driving situations such as the turning of the vehicle on to the obliquely curved approaches and exits of highways. The continued indication of a turn signal when one is intended creates an obvious driving hazard.

Accordingly, it is an object of this invention to provide an electric sounder device to remind the vehicle operator that the vehicle turn signal system is functioning.

Another object of this invention is to provide an electric sounder device that may be conveniently connected to a conventional turn signal system.

A further object of this invention is to provide an electric sounder device which will give an audible signal only after a predetermined period of time following initial operation of the turn signal.

The present invention is directed to a novel electric sounder device having only two terminals by which the sounder device may be connected across the terminals of a flasher switch in a turn signal system. The sounder device includes a bimetal time delay switch connected in series with the coil of an electromagnet between the two terminals. The heater element for the bimetal switch is also connected between the two terminals. During operation of the turn signal system to which the sounder device may be connected, the heater element is energized each time the flasher switch contacts open. Repeated energization of the heater element for a predetermined period of time heats the bimetal switch which closes. Thereafter, the electromagnet is energized each time the flasher switch contacts open and attracts a clapper armature which when released strikes a metal case enclosing the components of the sounder device.

These and other features of the invention will be more fully understood from the following description read in connection with the accompanying drawing in which.

Figure 1:
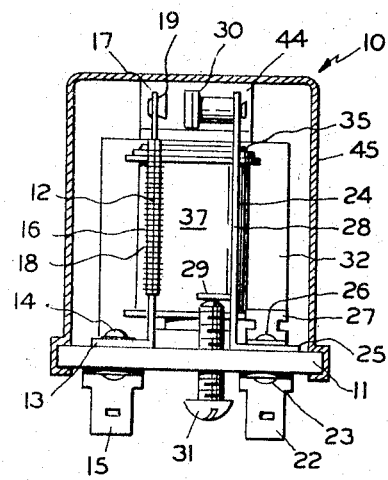
FIGURE 1 is a view in end elevation of the sounder device with the case thereof shown in section.
Figure 2:
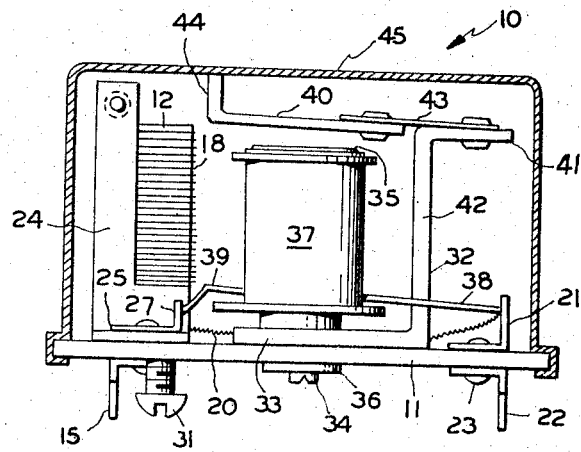
FIGURE 2 is a view in side elevation of the device as seen from the right side of FIGURE 1 with the case shown in section.

Referring first to FIGURES 1 and 2 of the drawing, the several parts of the sounder device 10 are all mounted upon a base plate 11 composed of rigid insulating material. A first bimetal element 12 has a base portion 13 which is secured to the inside surface of the plate 11 by a rivet 14 which also serves to secure a terminal 15 to the outer surface of the plate 11 in electrical connection with the bimetal element 12. The bimetal element 12 has a temperature responsive portion 16 which moves a contact portion 17. A heating element or coil 18 of resistance wire is wound about the portion 16 of the bimetal element 12 and has one end connected to the bimetal element 12 by a contact 19 that is secured to the contact portion 17. The other end of the heating element 18 is connected by a wire 20 to a connection lug 21. The lug 21 and a terminal 22 are electrically connected to each other and secured to the plate 11 by a rivet 23.

A second bimetal element 24 has a base portion 25 secured to the plate 11 by a rivet 26 which also holds a connection lug 27 against the base portion 25. The bimetal 24 also has a longitudinal temperature responsive portion 28 with an integral tongue portion 29 extending substantially normal to the portion 28. The free end of the temperature responsive portion 28 carries a contact 30 facing but normally separated from the contact 19. An adjusting screw 31 threaded in the plate 11 bears against the tongue portion 29 of the bimetal element 24 to vary the angular relation of the bimetal elements 12 and 24 and thus adjust the spacing between the contacts 19 and 30. The bimetal elements 12 and 24 are arranged so that both will deflect in the same direction (to the right in FIGURE 1) when heated. The bimetal element 12 when sufficiently heated by its heating element 18 will carry its contact 19 into engagement with the contact 30. The bimetal element 24 being subject principally to the ambient temperature serves to maintain substantially constant spacing between the contacts 19 and 30 as the ambient temperature varies.

Also mounted upon the plate 11 is a generally L shaped frame 32 of magnetic material. The foot portion 33 of the frame 32 is secured against the inner surface of the plate 11 by the reduced diameter portion 34 of a magnetic core 35 which passes through openings in the foot portion 33 and the plate 11 and which has its end upset against a metal washer 36. A coil 37 is wound on the core 35 and has its two leads 38 and 39 connected to the lugs 21 and 27 respectively. An armature 40 of magnetic material is secured to a support extension 41 of the leg portion 42 of the frame 32 by a spring hinge 43 which is fastened by rivets to the armature 40 and the support extension 41. The armature 40 is spring biased away from the core 35 by the spring hinge 43 with the striker arm 44 at the free end of the armature 40 normally engaging a cover or case 45 of sheet metal which is clamped to the base plate 11 to enclose the bimetal time delay switch and electromagnet just described. It will be understood that after the armature 40 is attracted to the core 35 upon energization of the coil 37, the striker arm 44 will strike the case 45 when the coil 37 is de-energized. The case 45 thus acts as a sounding element each time the coil 37 is de-energized.

Figure 3:
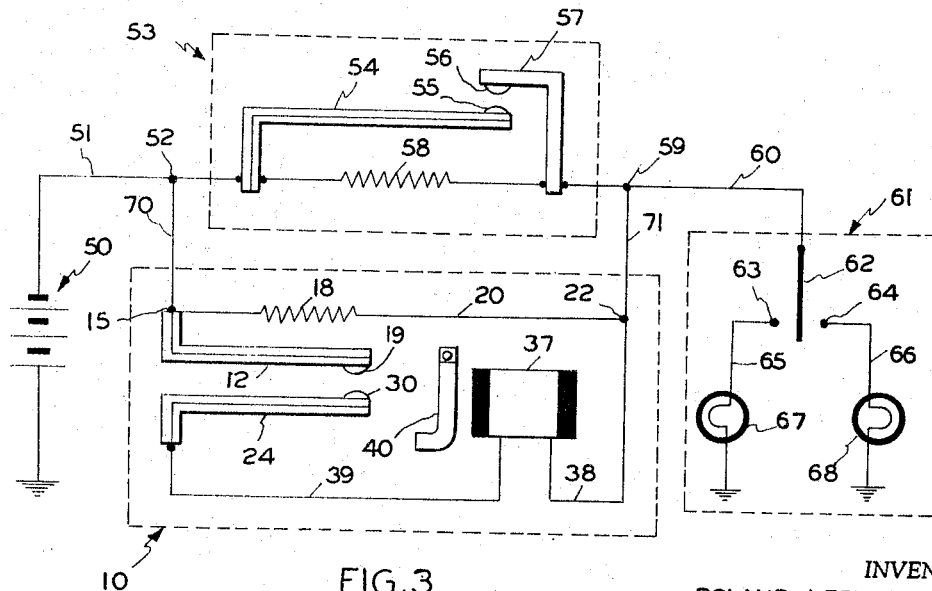
FIGURE 3 is a circuit diagram schematically illustrating the use of the device in a turn signal system.

As above stated, the sounder device 10 of this invention is particularly designed to use in an automotive turn signal system such as shown in FIGURE 3. Such a system includes a power source such as the vehicle storage battery 50 having one terminal grounded by connecting it with the frame of the vehicle. The other terminal of the battery 50 is connected by a conductor 51 to one terminal 52 of a flasher unit 53 which may be of any desired construction capable of providing intermittent energization of a turn signal circuit. As shown, the flasher unit 53 comprises a bimetallic strip 54 carrying a contact 55 normally separated from a fixed contact 56 secured to a support arm 57. A heating element 58 shown as a resistor is disposed adjacent to the bimetallic strip 54 and is connected between the ends of the bimetallic strip 54 and the support arm 57. The other terminal 59 of the flasher unit 53 is connected by the conductor 60 to a turn signal switch 61 which is illustrated as a simple single pole, double throw switch although other well known types of signal switches may be used. The turn signal switch 61 includes a movable contact 62 which is selectively movable to engage either of two fixed contacts 63 and 64. The fixed contacts 63 and 64 are connected respectively to conductors 65 and 66 which, in turn, are connected respectively to a left turn signal lamp 67 and a right turn signal lamp 68. The other terminals of the lamps 67 and 68 are grounded to complete return circuits to the grounded terminal of the battery 50.

The turn signal system thus far described operates in a conventional manner. When the movable contact 62 of the turn signal switch 61 is closed to either one of the fixed contacts 63 and 64, current will initially flow from the battery 50 thru the conductor 51, heating element 58, conductor 60 and the turn signal switch 61 to the selected signal lamp 67 or 68. As the resistance of the heating element 58 is considerably greater than that of either signal lamp, the signal lamp is not appreciably energized. The current flowing through the heating element 58 heats the bimetallic strip 54 which bends to move the contact 55 into engagement with the contact 56, thereby energizing the signal lamp with the entire voltage of the battery 50. At the same time, the contacts 55 and 56 short out the heating element 58 causing it to cool. The bimetallic element 54 also cools and separates the contacts 55 and 56. Current then flows through the heating element 58 again. In this fashion, the flasher unit 53 continues to intermittently energize the selected signal lamp as long as the turn signal switch 61 is closed.

The system shown in FIGURE 3 includes the device of the present invention shown somewhat schematically with its essential elements designated by the same reference numbers. The sounder device 10 has its terminal 15 connected by a conductor 70 to the terminal 52 of the flasher unit 53 and its terminal 22 connected by the conductor 71 to the terminal 59 of the flasher unit. It will be observed that the heating element 18 is thus connected in parallel with the contacts 55 and 56 of the flasher unit 53. Thus each time the contacts 55 and 56 open, the heating element 18 will be connected in series with the turn signal switch 61 and a selected one of the signal lamps 67 and 68. The resistance of the heating element 18 is considerably greater than that of either signal lamp and consequently the heating element 18 is intermittently energized as the flasher unit 53 operates. After a predetermined interval of time depending upon the setting of the adjustment screw 31, the heating element 18 sufficiently heats the bimetal element 12 to cause the engagement of contact 19 with the contact 30. This completes an energizing circuit for the coil 37 extending from the terminal 15 through the bimetal element 12, contacts 19 and 30, bimetal element 24, conductor 39, coil 37, and conductor 38 to the terminal 22. As this coil energizing circuit is connected in parallel with the contacts 55 and 56 of the flasher unit 53 by the conductor 70 and 71, the coil 37 will then be energized each time the contacts of the flasher unit 53 are opened. The high resistance of the coil 37 prevents any effective current flow to the signal lamp. Each time the coil 37 is energized, the armature 40 is attracted to the coil. When the contacts 55 and 56 of the flasher unit 53 then close, they short out the coil 37. This de-energizes the coil 37 and the spring hinge 43 restores the armature 40 to its unattracted position causing the striker arm 44 to strike the case 45. Thus the armature 40 operates each time that the contacts 55 and 56 of the flasher unit 53 open. The repetitive sound produced by the striker arm 44 striking the case 45 warns the vehicle operator that the turn signal system is in operation so that he may manually return the turn signal switch to its neutral off position.

From the foregoing, it can be seen that the sounder device of the present invention may be simply connected to turn signal systems already installed in vehicles or may be installed as a part of the original turn signal system of a vehicle. A distinct audible indication of continued turn signal operation is given by the sounder device yet the sounder device in no way affects the normal operation of the turn signal system with which it is used other than to cause a small increase in the flashing rate of the flasher unit. If it is desired to change the time interval which it takes before the sounder device provides an audible signal, this can be easily done by turning the adjustment screw.

Various changes in the shape, size and arrangement of the parts may be made to the form of the invention herein shown and described without departing from the scope of the invention as defined in the following claims.

What is claimed is:

1. An electrical sounder device for automotive turn signal systems including a flasher switch having first and second terminals connecting a power source to a turn signal switch operable to selectively energize turn signal lamps repetitively from said source through said flasher switch comprising:
   (a) an electromagnet having a core, a coil on said core, an armature attracted to the core when the coil is energized, and spring means normally biasing said armature away from said core;
   (b) a bimetal switch having a pair of normally open contacts which are closed by the heating of the bimetal switch;
   (c) a resistance heating element positioned in heating relation to said bimetal switch for closing said switch a predetermined period of time after current is caused to flow through said heating element and thereafter maintaining said bimetal switch closed as long as current is caused to flow through said heating element;
   (d) a base plate and a case enclosing said electromagnet, bimetal switch and heating element;
   (e) a striker arm on said armature normally urged into engagement with said case by said spring means and arranged to strike said case each time the electromagnet coil is de-energized thereby causing at least a portion of said case to act as a sounding element;
   (f) first and second terminal means carried by said base plate and adapted for connection to the two terminals of a flasher switch;
   (g) first circuit means electrically connecting said heating element between said first and second terminal means to produce current flow through said heating element when said flasher switch is connected to said turn signal lamps by said turn signal switch;
   (h) and second circuit means connecting said bimetal switch and said electromagnet coil in series between said first and second terminal means to produce repetitive energization and deenergization of said electromagnet coil after closing of said bimetal switch when said flasher switch is connected to said turn signal lamps by said turn signal switch.

2. An electrical sounder device for automotive turn signal systems including a flasher switch having first and second terminals connecting a power source to a turn signal switch operable to selectively energize turn signal lamps repetitively from said source through said flasher switch comprising:
   (a) a base plate of insulating material;
   (b) an electromagnet mounted upon said base plate and including a core, a coil on said core, an armature attracted to the core when the coil is energized, and spring means normally biasing said armature away from said core;

(c) first and second bimetal elements each anchored at one of its ends to said base plate, the other ends of said bimetal elements being movable in the same direction when heated and carrying normally open contacts in position to engage each other in response to relative movement between said bimetallic elements;

(d) a resistance heating element positioned in effective heating relation with only one of said bimetal elements for causing said contacts to close a predetermined period of time after current is caused to flow through said heating element and thereafter maintaining said contacts closed as long as current is caused to flow through said heating element;

(e) a metal case secured to said base plate and enclosing said electromagnet, bimetal elements and heating element;

(f) a striker arm on said armature normally urged into engagement with said case by said spring means and arranged to strike said case each time the electromagnet is de-energized thereby causing at least a portion of said case to act as a sounding element;

(g) first and second terminal means carried by said base plate and adapted for connection of the two terminals of a flasher switch;

(h) first circuit means connecting said heating element between said first and second terminal means to produce current flow through said heating element when said flasher switch is connected to said turn signal lamps by said turn signal switch;

(i) and second circuit means connecting said contacts and said electromagnet coil in series between said first and second terminal means to produce repetitive energization and deenergization of said electromagnet coil after closing of said contacts when said flasher switch is connected to said turn signal lamps by said turn signal switch.

3. An electrical sounder device according to claim 2 including an integral tongue portion on one of said bimetal elements extending substantially normal thereto intermediate the ends thereof; and an adjusting screw threaded in said base plate and abutting against said tongue portion for varying the angular relation of said bimetal elements to selectively determine the duration of said predetermined period of time.

References Cited by the Examiner
UNITED STATES PATENTS

| | | | |
|---|---|---|---|
| 2,740,923 | 4/1956 | Loeber | 200—88.2 X |
| 2,835,879 | 5/1958 | Du Rocher et al. | 340—74 |
| 2,896,190 | 7/1959 | Gallaro et al. | |

NEIL C. READ, *Primary Examiner.*

I. J. LEVIN, *Assistant Examiner.*